US006480907B1

(12) United States Patent
Chen et al.

(10) Patent No.: US 6,480,907 B1
(45) Date of Patent: Nov. 12, 2002

(54) APPARATUS AND METHOD FOR TESTING THE WAIT SIGNAL LINE OF A COMMUNICATION INTERFACE SOCKET

(75) Inventors: Tong S Chen, Taipei (TW); Kuang Shin Lin, Taipei (TW); Xue-Ning Ren, Tianjin (CN)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/492,359

(22) Filed: Jan. 27, 2000

(51) Int. Cl.[7] .............................................. G06F 11/267
(52) U.S. Cl. .............................. 710/15; 710/62; 710/72; 710/100; 710/305; 713/401; 713/500; 714/25
(58) Field of Search ........................ 710/15–19, 62–64, 710/72–74, 103, 305; 713/400–503; 714/25

(56) References Cited

U.S. PATENT DOCUMENTS 5,613,092 A * 3/1997 Lim et al. .................... 710/102
5,818,029 A * 10/1998 Thomson ..................... 235/486
5,875,293 A * 2/1999 Bell et al. ..................... 714/27
6,041,374 A * 3/2000 Postman et al. .............. 710/73
6,209,050 B1 * 3/2001 Iho et al. ..................... 710/101

FOREIGN PATENT DOCUMENTS

GB          2358933       *  8/2001  ........... G01R/31/28

* cited by examiner

Primary Examiner—Christopher B. Shin
(74) Attorney, Agent, or Firm—Birch, Stewart, Kolasch & Birch, LLP

(57) ABSTRACT

The present invention relates to an apparatus and method for testing the WAIT signal line of a communication interface socket to detect whether the WAIT signal line of the socket, such as a PCMCIA socket, can work properly. The present invention utilizes an electrical switch and several status signal lines, such as IOWR and IN signal lines, to identify the status of the WAIT signal line and detect whether the WAIT signal line works properly according to the status signal lines being in a HIGH state or a LOW state.

13 Claims, 4 Drawing Sheets

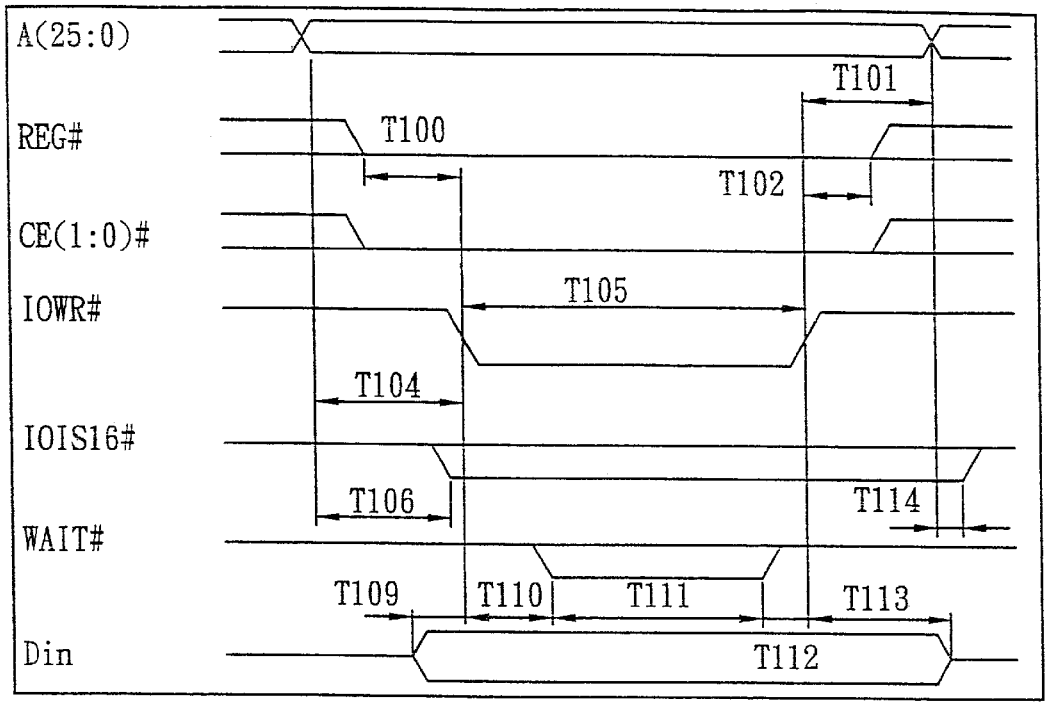

| Ref | Symbol | Description | Min | Max |
|---|---|---|---|---|
| T100 | tsuREG(TWOR) | REG# setup to IOWR# | 5ns | |
| T101 | thA(IOWR) | Address hold after IOWR# de-asserted | 20ns | |
| T102 | thREG(IOWR) | REG# hold after IOWR# de-asserted | 0ns | |
| T103 | tsuCE(IOWR) | CE# to IOWR# setup time | 5ns | |
| T104 | tsuA(IOWR) | Address setup before IOWR# | 70ns | |
| T105 | twIOWR | IOWR# strobe width | 165ns | |
| T108 | tdfIOIS16 | IOIS16# delay from Adress valid | | 35ns |
| T109 | tsu(IOWR) | Data Setup before IOWR# | 60ns | |
| T110 | tdWT(IOWR) | IOWR# to Wait# delay | | 35ns |
| T111 | tw WT | Wait# width | | 12ns |
| T112 | tdr IOWR(WT) | Wait# deasserted to IOWR# deasserted | 0ns | 30ns |
| T113 | th(IOWR) | Data hold after IOWR# deasserted | | 35ns |
| T114 | tdrIOIS16 (ADR) | IOIS16# delay from address invalid | | 20ns |
| T115 | thCE(IOWR) | CE# hold after IOWR# deasserted | 20ns | |

FIG. 3

APPARATUS AND METHOD FOR TESTING THE WAIT SIGNAL LINE OF A COMMUNICATION INTERFACE SOCKET

BACKGROUND OF THE INVENTION

1. Field of Invention

The present invention relates to an apparatus and method for testing the WAIT signal line of a communication interface socket, which is applicable for the computer to detect whether the signal lines of its sockets can work properly.

2. Related Art

Nowadays, the communication interface socket has become a necessary one among the extended connection sockets of a computer. For example, the PCMCIA socket of a notebook computer has 68 pins and is used to accommodate a credit card size but a little thicker extended functional card, such as the network card, FAX/MODEM card, and MPEG card, etc. to enhance the ability of the notebook computer.

At present, the extended functional cards can be divided into three different specifications, Type I, Type II, and Type III, respectively. Each of the extended functional cards belong to the three specifications has a corresponding connection port to the 68 pins connector of a PCMCIA socket to transmit data between the extended functional card and the notebook computer. Therefore, in order to check whether an extended functional card can be used in a notebook computer, each of the pins of the PCMCIA socket should be tested at first.

The WAIT signal line is a special one among the lines of the PCMCIA socket, which is used to extend the Bus Access Cycle when the communication speed specified by the computer or the extended functional card is not fast enough. The function of the WAIT signal line is transparent to the software, in other words, the driver software for controlling the PCMCIA interface can work properly without knowing the actual status of this signal line, whereas it is very important in the hardware design.

If the Bus Access Cycle is faster than the specified speed, then the hardware controller will not be possible to receive or transmit data in the specified speed and consequently result a lot of error data. Therefore, the extended functional card can not be used.

Up to now, a special apparatus called SYCARD has been used for testing the computer interface sockets. It utilizes a testing software installed in the computer and a special testing interface card inserted into the communication interface socket to test the data read and write operations of the testing card.

The approach used by the SYCARD for testing the WAIT signal line can be described as below. The PCMCIA socket controller is controlled to produce 700 ns of delay and the Bus Access Cycle is also measured. If the duration time of the Bus Access Cycle exceeds 700 ns, then the status of the WAIT signal line can be regarded as correct. But in order to measure the time in the order of ns, i.e. $10^{-9}$, the resolution of the measurement instruments should be quite high and the cost is also high. Therefore, the SYCARD utilizes specialized ASICs to perform the testing and the cost is very expansive.

SUMMARY OF THE INVENTION

The primary object of the present invention is to provide an apparatus and method for testing the WAIT signal line of a communication interface socket, which can utilize some simple tools to detect whether the WAIT signal line of the PCMCIA socket can work properly without using any complex approach commonly used today.

One another object of the present invention is to provide an apparatus and method for testing the WAIT signal line of a communication interface socket to save the cost for testing the WAIT signal line of the PCMCIA socket.

One more object of the present invention is also to provide an apparatus and method for testing the WAIT signal line of a communication interface socket, by which the testing approach is greatly simplified without lowing the measurement resolution as compared with the current approaches so as to improve the test efficiency.

According to the technologies disclosed in the present invention, the apparatus for testing the WAIT signal line of a communication interface socket comprises:

a socket connection interface, which is used to connect to the communication interface socket for the testing of the signal lines;

a group of status signal lines, which comprises the IOWR and IN signal lines for identifying the status of the WAIT signal line;

an electrical switch, which is used to connect the IOWR signal line with the IN signal line so that the status of the IOWR signal line can be represented by that of the IN signal line; and a group of switch control lines, which comprises several signal lines for enabling/disabling the electrical switch.

According to the technologies disclosed in the present invention, the method for testing the WAIT signal line of a communication interface socket comprises:

enabling the electrical switch;

executing an I/O write operation to change the status of the IOWR signal line into a LOW state;

connecting the IN signal line with the IOWR signal line so that the status of the IOWR signal line can be represented by the status of the IN signal line;

detecting the statuses of the IN signal line and the IOWR signal line;

detecting whether the IN signal line always keeps in a LOW state for 12 us of delay; and showing the status of the WAIT signal line according to the detection results.

Wherein, the statuses of the IN signal line and the IOWR signal line are the same when the electrical switch is enabled. If the IN signal line always keeps in a LOW state for 12 us of delay, the WAIT signal line can be regarded as normal, whereas if a HIGH state happened upon the IN signal line during 12 us of delay, the WAIT signal line should be regarded as abnormal.

BRIEF DESCRIPTION OF THE DRAWINGS

The present invention will become more fully understood from the detailed description given hereinbelow illustration only, and thus are not limitative of the present invention, and wherein:

FIG. 3 shows a timing diagram of the signal lines according to the present invention.

DETAILED DESCRIPTION OF THE INVENTION

Figure 1:
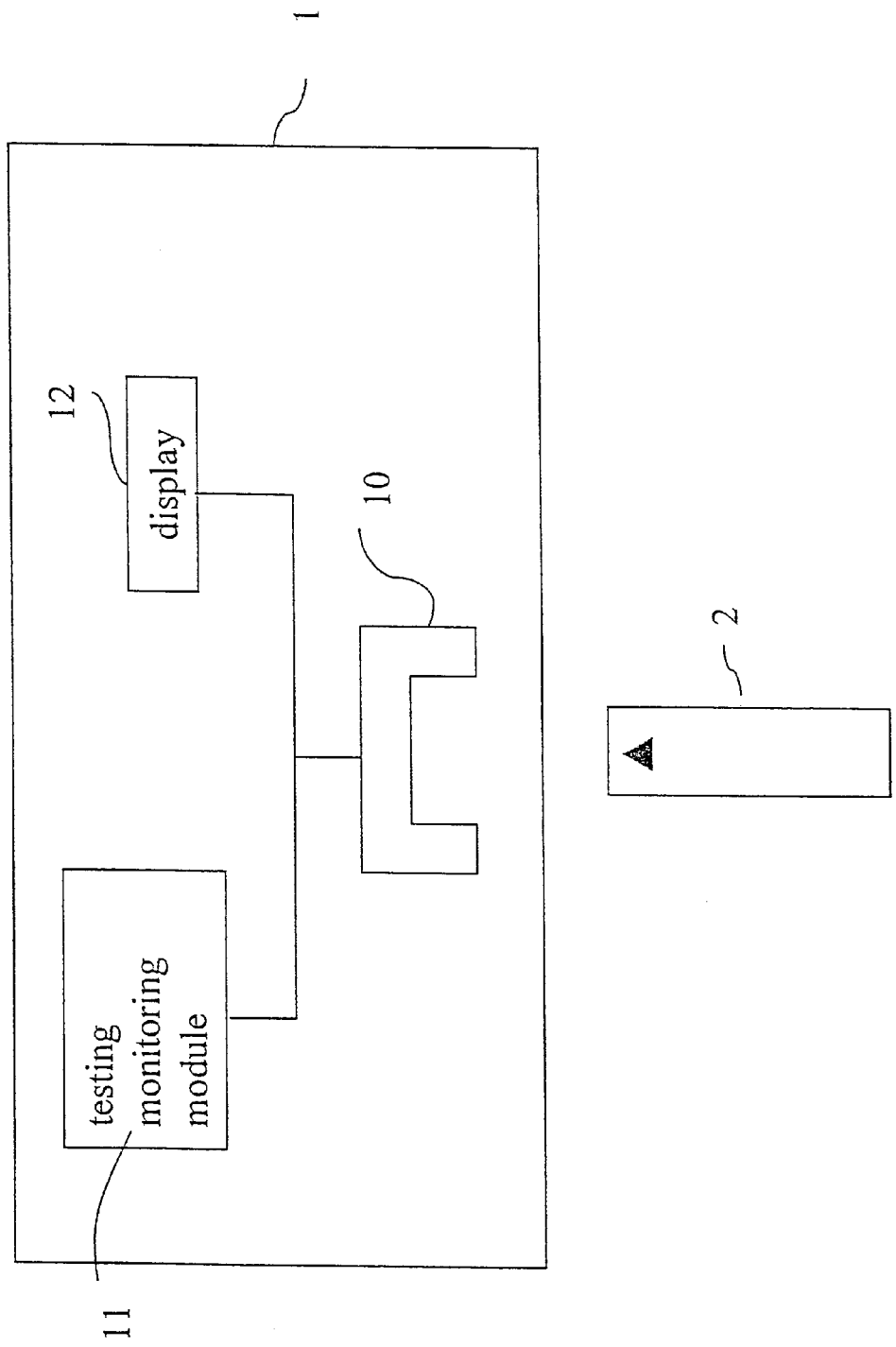
FIG. 1 shows a simplified framework according to the present invention.

An embodiment of the proposed apparatus and method according to the present invention utilizes a testing apparatus 2, which is inserted into the PCMCIA socket 10 of a notebook computer 1, and a testing monitoring module 11, which is installed in the notebook computer 1, to test the WAIT signal line of the PCMCIA socket 10, and show the result of testing on the display unit 12, as shown in FIG. 1.

The basic principles of the testing method according to the present invention can be described as below. The testing apparatus according to the present invention comprises an electrical switch, which is used as a switch of enabling/disabling the testing. When the electrical switch is disabled, the WAIT, IN, and IOWR signal lines work independently without affecting each other and the status of the WAIT signal line is usually in a HIGH state. If the electrical switch is enabled, the IN signal line will be connected with the IOWR signal line, that is, IN=IOWR, and the IOWR signal line will come into being in a LOW state. After 35 ns of delay, the WAIT signal line should also come into being in a LOW state and last for 12 us. Consequently, both of the WAIT and IOWR signal lines will be in a LOW state and, therefore, the IOWR signal line will also keep in a LOW state during the 12 us of delay. However, if the WAIT signal line changes into a HIGH state, the IOWR signal line will also come into being in a HIGH state.

The 12 us delay of the WAIT signal line is resulted from the internal circuit delay of the WAIT signal line. But by using the current approaches, the internal circuit of the PCMCIA socket can produce no more than 700 ns of delay. Therefore, it is obviously that the measurement resolution can be greatly reduced by using the presented apparatus.

Figure 2:
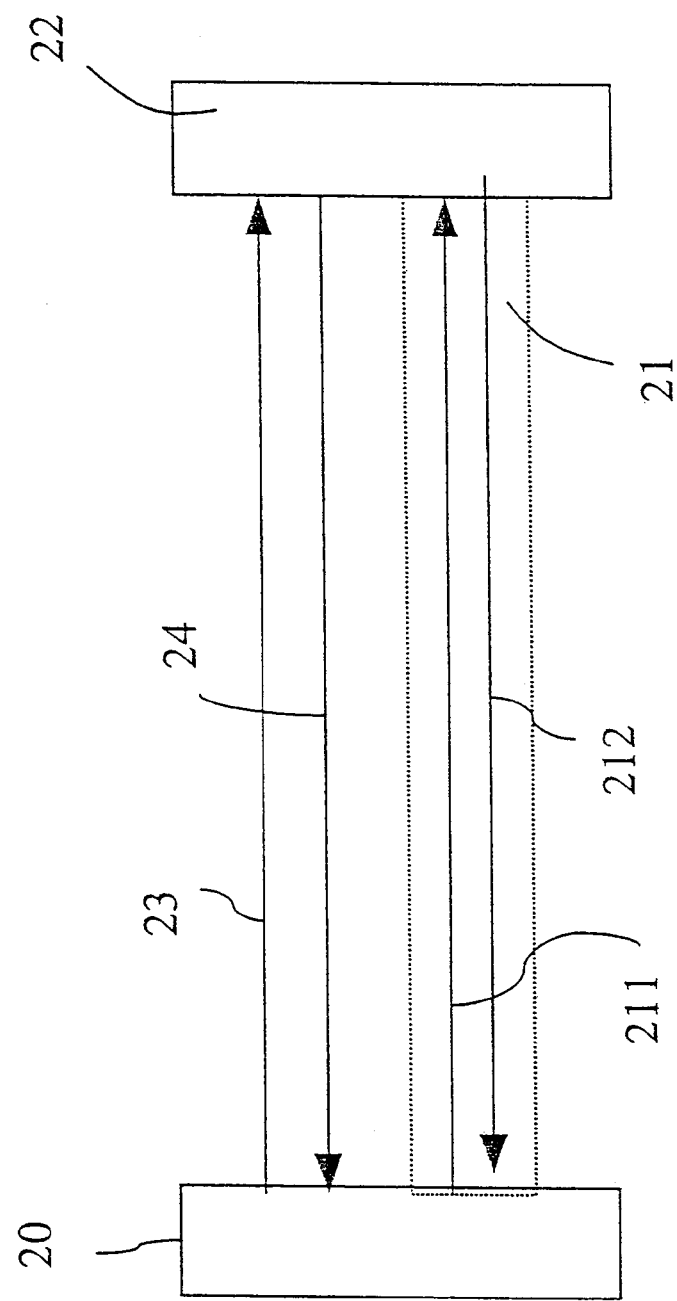
FIG. 2 shows an embodiment of the apparatus according to the present invention.

As described above, the apparatus for testing the WAIT signal line according to the present invention, as shown in FIG. 2, comprises:

- a socket connection interface 20, which is used to connect to the communication socket for the testing of the signal lines;
- a group of status signal lines 21, which comprises the IOWR signal line 211 and the IN signal line 212 for identifying the status of the WAIT signal line 24;
- an electrical switch 22, which is used to connect the IOWR signal line 211 with the IN signal line 212 so that the status of the IOWR signal line 211 can be represented by that of the IN signal line 212; and
- a group of switch control lines 23, which comprises several signal lines for enabling/disabling the electrical switch 22.

Wherein, the electrical switch 22 can be a programmable login circuit with several switch control lines 23. When the electrical switch 22 is disabled, the WAIT signal line 24, the IOWR signal line 211, and the IN signal line 212 will work independently without affecting each other and the status of the WAIT signal line 24 is usually in a HIGH state. If the electrical switch 22 is enabled, the IN signal line 212 will be connected with the IOWR signal line 211, that is, IN=IOWR, which means that the statuses of the two signal lines are the same and consequently the status of the IOWR signal line 211 can be represented by that of the IN signal line 212.

After the electrical switch 22 being enabled, the status of the IOWR signal line 211 will be changed from a HIGH state into a LOW state. During the 35 ns of delay after the IOWR signal line 211 being changed into a LOW state, the WAIT signal line 24 should also be changed from a HIGH state into a LOW state and last for 12 us. The apparatus according to the present invention then detects whether the WAIT signal line 24 works properly during the 12 us of delay. When the electrical switch 22 is disabled, the WAIT signal line 24 will be changed from a LOW state into a HIGH state and the testing is also finished. The timing diagram of the signal lines is shown in FIG. 3.

The method according to the present invention comprises:

step A0: beginning of a testing;

step A1: enabling the electrical switch;

step A2: executing an I/O write operation;

step A3: connecting the IN signal line with the IOWR signal line;

step A4: detecting the status of the IN signal line, if the IN signal line is in a LOW state, then execute the following step, otherwise jump to step A9;

step A5: checking whether the time delay has been 12 us, if it is true, then execute the following step, otherwise jump back to step A4;

step A6: showing that the WAIT signal line works properly;

step A7: disabling the electrical switch;

step A8: ending of the testing;

step A9: showing that the WAIT signal line doesn't work properly.

Figure 4:
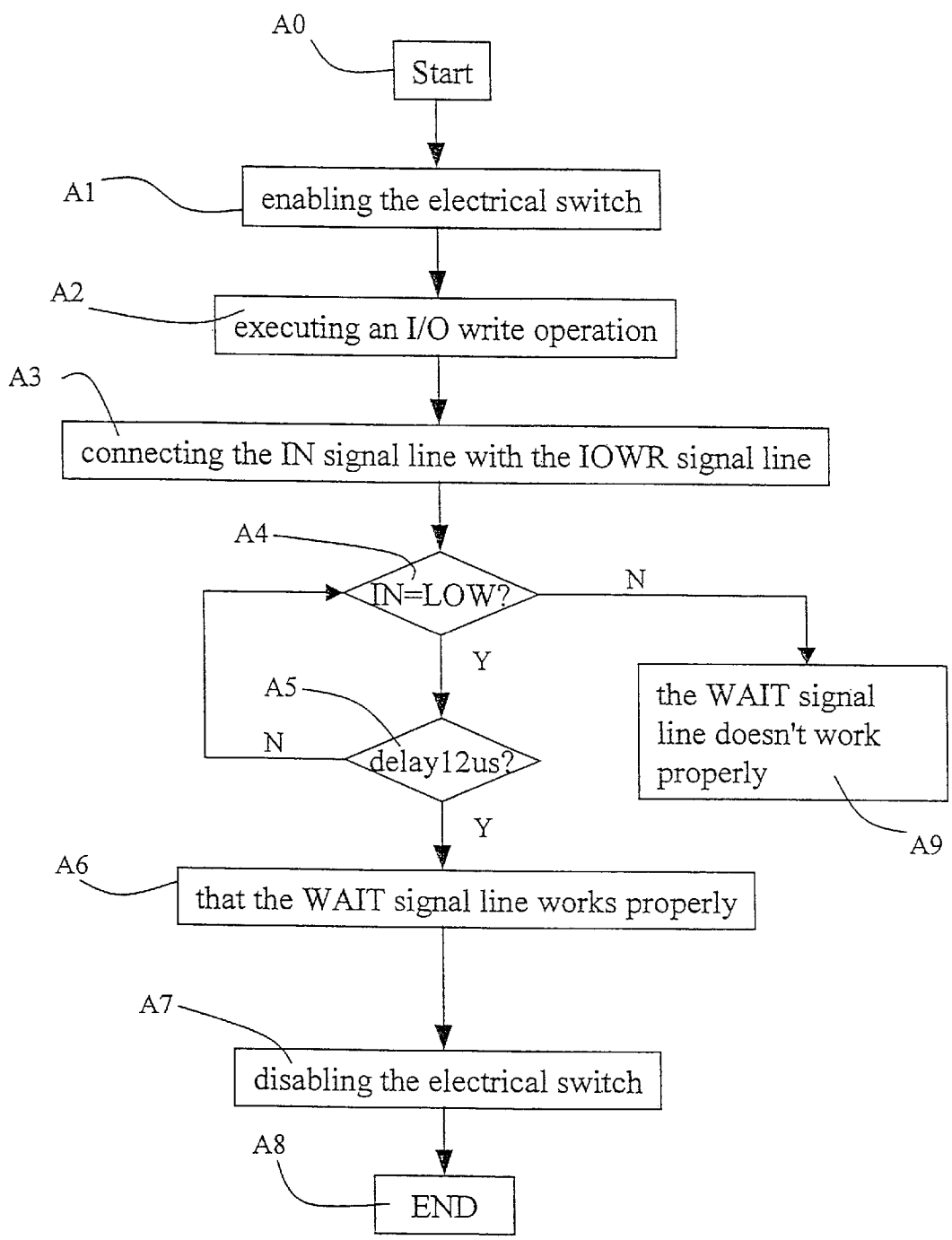
FIG. 4 shows the flow chart of the method according to the present invention.

The above steps will be described in more details with reference to the flow chart shown in FIG. 4 as following:

In the beginning of testing, assert the switch control lines 23 in a HIGH state to enable the electrical switch 22 so as to process the testing, as referring to step A1. Then execute an I/O write operation for the socket, as referring to step A2, to change the IOWR signal line 211 from a HIGH state into a LOW state and, therefore, the WAIT signal line 24 should also be changed from a HIGH state into a LOW state if the electrical switch 22 is enabled. The IOWR signal line 211 can also be connected with the IN signal line 212 by enabling the electrical switch 22, as referring to step A3, so that the status of the IOWR signal line 211 can be obtained from that of the IN signal line 212, that is, the statuses of both the two signal lines will be the same. Therefore, the status of the WAIT signal line 24 can be easily detected according to that of the IN signal line 212. If the status of the IN signal line 212 is the same as that of the WAIT signal line 24, then the WAIT signal line should work properly. Since the IN signal line 212 should be in a LOW state after executing the I/O write operation, therefore, the only thing need to do for determining whether the WAIT signal line 24 works properly is to check whether the WAIT signal line 24 is in a LOW state, as referring to step A4. That is, if the WAIT signal line 24 is in a LOW state, then the WAIT signal line should work properly and thus show normal, as referring to step A6, whereas if the WAIT signal line 24 is not in a LOW state but a HIGH state, then the WAIT signal line 24 should work improperly and thus show abnormal, as referring to step A9.

Continuously check whether the IN signal line 212 always keeps in a LOW state for 12 us, as referring to step A5. If it is true, then the WAIT signal line should work properly and show normal on a display unit 12, whereas if the delay time has not been 12 us, then accumulate the delay time continuously. During the 12 us of delay time, continuously check whether the IN signal line 212 always keeps in a LOW state, in other words, check whether the IOWR signal line 211 always keeps in a LOW state. If it is true, then the WAIT signal line 24 should work properly, otherwise there must be something wrong upon the WAIT signal line 24. Wherein, the 12 us of delay time is determined by a computer and is preferred according to the present invention. After checking the status of the WAIT signal line and showing the result on the display, then change the signal control lines 23 into a LOW state to disable the electrical switch 22, as referring to step A7, and finish the whole testing.

The apparatus and method for testing the WAIT signal line of a communication interface socket according to the present invention has the following benefits:

1. The status of the WAIT signal line of a PCMICA socket can be easily tested by using some simple tools and thus the testing complexity can be greatly reduced as compare with the current approaches.
2. The cost for testing the WAIT signal line of a PCMICA socket can be greatly reduced.
3. The measurement resolution according to the present invention is quite low as compare with that of the current approaches, therefore, the testing efficiency can be greatly improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for testing the WAIT signal line of a communication interface socket, comprising:
    a socket connection interface, which is used to connect to the communication interface socket for the testing of the signal lines;
    a group of status signal lines, which comprises IOWR and IN signal lines for identifying the status of the WAIT signal line;
    an electrical switch, which is used to connect the IOWR signal line with the IN signal line so that the status of the IOWR signal line can be represented by that of the IN signal line; and
    a group of switch control lines, which comprises several signal lines for enabling/disabling the electrical switch.

2. The apparatus for testing the WAIT signal line of a communication interface socket of claim 1 wherein the electrical switch can be a programmable logic circuit.

3. The apparatus for testing the WAIT signal line of a communication interface socket of claim 1 wherein if the switch control lines are in a HIGH state, the electrical switch is enabled; whereas if the switch control lines are in a LOW state, the electrical switch is disabled.

4. A method for testing the WAIT signal line of a communication interface socket, comprising the following steps:
    enabling the electrical switch;
    executing an I/O write operation to change the status of the IOWR signal line;
    connecting the IN signal line with the IOWR signal line;
    detecting the statuses of the IN signal line and the IOWR signal line;
    checking the delay time of the IN signal line; and
    showing the status of the WAIT signal line according to the detection results.

5. The method for testing the WAIT signal line of a communication interface socket of claim 4 wherein the status of the IOWR signal line will be changed from a HIGH state into a LOW state after executing the I/O read/write operations.

6. The method for testing the WAIT signal line of a communication interface socket of claim 4 wherein the IN signal line can be connected/disconnected with the IOWR signal line by enabling/disabling the electrical switch.

7. The method for testing the WAIT signal line of a communication interface socket of claim 4 wherein the statuses of the IN signal line and the IOWR signal line are the same when the two signal lines are connected.

8. The method for testing the WAIT signal line of a communication interface socket of claim 4 wherein the WAIT signal line works properly if the IN signal line is in a LOW state; whereas the WAIT signal line works improperly if the IN signal line is in a HIGH state.

9. The method for testing the WAIT signal line of a communication interface socket of claim 4 wherein the delay time of the IN signal line is 12 us.

10. The method for testing the WAIT signal line of a communication interface socket of claim 4 wherein the IN signal line is in a LOW state during the delay time.

11. A method for testing the WAIT signal line of a communication interface socket, comprising the following steps:
    enabling the electrical switch;
    executing an I/O write operation to change the status of the IOWR signal line into a LOW state;
    connecting the IN signal line with the IOWR signal line so that the status of the IOWR signal line can be represented by that of the IN signal line;
    detecting the statuses of the IN signal line and the IOWR signal line;
    checking whether the IN signal line always keeps in a LOW state for the 12 us of delay; and
    showing the status of the WAIT signal line according to the detection results.

12. The method for testing the WAIT signal line of a communication interface socket of claim 11 wherein the statuses of the IN signal line and the IOWR signal line are the same when the electrical switch is enabled.

13. The method for testing the WAIT signal line of a communication interface socket of claim 11 wherein the WAIT signal line works properly if the IN signal line is in a LOW state; whereas the WAIT signal line works improperly if the IN signal line is in a HIGH state.

* * * * *